United States Patent [19]
Bastian et al.

[11] Patent Number: 5,976,226
[45] Date of Patent: Nov. 2, 1999

[54] MEANS TO ENSURE A MINIMUM OF GAS CONTENT IN LIQUIDS USED FOR HEAT EXCHANGE AND INSULATING PURPOSES WITH COMPLEMENTARY MEANS FOR LIQUID EXPANSION INTO VESSELS WITH VARIABLE VOLUMES

[76] Inventors: Jürgen Bastian; Anne Isobel Bastian, both of 38 rue Norbert Bourgeys, Ophain B.S.I., Belgium, B-1421

[21] Appl. No.: 08/993,724

[22] Filed: Dec. 18, 1997

[51] Int. Cl.⁶ .............................. B01D 19/00; H01F 27/14
[52] U.S. Cl. ................................. 96/6; 96/193; 96/194; 174/12 R; 174/15.1; 336/57
[58] Field of Search ............................... 95/46, 266, 247, 95/248; 96/6, 193, 194, 197; 174/12 R, 15.1; 336/58, 57, 59, 60, 61

[56] References Cited

U.S. PATENT DOCUMENTS

| | | | |
|---|---|---|---|
| 1,966,791 | 7/1934 | Fowler et al. | 96/193 |
| 2,201,870 | 5/1940 | Piercy et al. | 96/197 |
| 2,962,863 | 12/1960 | Caroli | 96/194 |
| 3,043,900 | 7/1962 | Reisinger | 174/12 R |
| 3,253,081 | 5/1966 | Nakazawa et al. | 174/12 R |
| 3,344,380 | 9/1967 | Schmid | 174/12 R |
| 3,448,219 | 6/1969 | Nakazawa et al. | 174/12 R |
| 3,591,946 | 7/1971 | Loe | 96/193 |
| 3,866,460 | 2/1975 | Pearce, Jr. | 96/6 |
| 3,894,171 | 7/1975 | Kusay | 96/201 |
| 3,934,453 | 1/1976 | Hessen | 174/12 R |
| 3,989,102 | 11/1976 | Jaster et al. | 174/15.1 |
| 4,124,834 | 11/1978 | Walsh | 336/57 |
| 4,330,033 | 5/1982 | Okada et al. | 336/58 |
| 4,437,082 | 3/1984 | Walsh et al. | 174/15.1 |
| 4,456,172 | 6/1984 | Roffelsen | 96/193 |
| 4,696,684 | 9/1987 | Shen | 96/193 |
| 4,718,922 | 1/1988 | Roffelsen | 95/266 |
| 5,324,886 | 6/1994 | Nakatake et al. | 174/15.1 |

FOREIGN PATENT DOCUMENTS

| | | | |
|---|---|---|---|
| 750322 | 12/1996 | European Pat. Off. . | |
| 56-76205 | 6/1981 | Japan | 96/6 |
| 24913 | 9/1931 | Netherlands | 96/197 |
| 966405 | 10/1982 | U.S.S.R. | 96/266 |
| 2129437 | 5/1984 | United Kingdom | 95/266 |

*Primary Examiner*—Duane S. Smith

[57] ABSTRACT

The invention, intended for large power transformers and industrial heat transfer installations, is systemic in nature and calls upon two components which complement each other, the first one effecting the continuous on-line de-gassing of an insulating or heat transfer medium by the application of a vacuum whose pressure reducing effect is compensated by hydrostatic pressure or the combination of an impeller downstream and a restrictor upstream of the pressurized part; the second component of the complementary system is constituted by an expansion space which is separated from a displaceable buffer liquid by a membrane.

1 Claim, 2 Drawing Sheets

MEANS TO ENSURE A MINIMUM OF GAS CONTENT IN LIQUIDS USED FOR HEAT EXCHANGE AND INSULATING PURPOSES WITH COMPLEMENTARY MEANS FOR LIQUID EXPANSION INTO VESSELS WITH VARIABLE VOLUMES

FIELD OF THE INVENTION

In liquids used in high-temperature heat transfer installations and in electrical transformers for heat transfer and electrical insulation, liberation of dissolved gases is a major hazard. Irrespective of the actual cause of gas liberation and the mechanisms involved in what is generally referred to as cavitation, the likelihood of its occurrence depends mainly on the relative gas saturation of the liquid.

Keeping the liquid, generally referred to as "oil", in a state of low gas saturation is therefore of great interest for transformer operators and high-temperature liquid-phase heat transfer plant. While in the field of electrical transformers a low level of gas saturation will reduce the likelihood of fault generation and fault escalation, in high-temperature heat transfer installations the benefit of a low level of gas saturation will be seen mainly in terms of simpler installation and in reduction of downtime, as the main cause of pump failure, i.e. cavitation, will be eliminated.

As the two components of the invention are complementary to each other in both fields to which they apply, and as they are used in much the same way, the following specification uses as an example mainly the field of large power transformers. This seems all the more appropriate, as attempts in the direction of the present invention appear to have been made only in the field of electrical power.

DESCRIPTION OF THE RELATED ART

In liquid-cooled electrical transformers the liquid has both an electrical insulating and a heat transfer function. The circumstances which enable one of the two functions to work efficiently may have a detrimental influence on the other function. Thus, in the traditional transformer, temperature-driven liquid volume change requires an expansion vessel or some other compensation or expansion element. In the case of the breathing expansion vessel or conservator, the liquid will be in contact with air; in the case of nitrogen blanketing without separating membrane, the liquid will be in contact with nitrogen. Alternatively, the compressible buffer gas can be enclosed in, or separated from the liquid by, a membrane.

In the latter variation, as in the integrally filled hermetic transformer, one attempts to keep the liquid free of extraneous gases; however, this design option entails the potential of an accumulation of decomposition gases which are generated by partial discharges, transient overvoltages and other service conditions leading to decomposition. As the liquids commonly used have a high saturation threshold, the gases will, over the service temperature range, not cause any significant rise in pressure, as they will stay below the saturation threshold, but will always lower the flashpoint. Once the saturation threshold has been reached, the gases will, where possible, leave the liquid phase and create inhomogeneities which are highly undesirable, as they can initiate an ionizable path. Gas liberation, i.e. the formation of micro-bubbles, takes place preferentially at places of high turbulence. As these are the very places where electrostatic discharges can occur, the hazard relevance of the cavitation phenomenon is all the more significant. The problems described above are quite uncommon in the primary voltage range below 20 kV.

Hermetic-type integrally filled transformers are mainly used with fairly small power ratings, mainly because large units pose serious problems of inelastic (plastic) deformation and metal fatigue. Experience has shown that low liquid temperatures which cause considerable negative pressures can lead to the ingress of air and humidity—not always apparent, as air ingress will have occurred long before traces of oil become apparent, typically at joints and welds.

Electrical transformers, especially larger ones, are typically equipped with breathing expansion vessels, so-called conservators, to allow for the temperature-driven liquid volume changes. The air drawn in during the cooling phase passes through a dryer and oil filter which retains air impurities. Drying efficiency depends on the speed with which the air passes over the dryer and the dryer's hygroscopicity. Depending on the load pattern, the dryer requires little or considerable maintenance. Because of this disadvantage and in order to be able to use the buffer gas for diagnostic purposes, different arrangements of membranes have become known, which have in common that they attempt to keep out air, especially its oxygen content, and humidity.

Various materials have been used as membranes, mechanical strength and a low order of permeability being the main criteria. However, it is known that the rubber membranes commonly used are not impermeable to the cushioning gases (air or nitrogen) commonly used.

Due to negative experience, many transformer users have abandoned the use of membranes. No membrane is used in a device described in Patent Abstracts of Japan Vol. 13 No. 439 (E-827) and JP-A-1166511. This is astonishing, as the solution to the problem is thus rendered more difficult: The device works on the principle that passing of a gas saturation threshold, which is related to pressure and temperature, will cause the withdrawing of a predetermined quantity of the liquid, its degassing and its substitution by a quantity of previously degassed liquid. This process has to be repeated continuously, as the buffer gas will dissolve in the liquid with which it is in contact. However, as this process takes longer than degassing, the goal of keeping the insulated liquid in a de-saturated state can be attained. The absence of a membrane makes it impossible to physically distinguish between decomposition gases and the buffer gas.

A significant improvement to compensating balloons etc. would be possible by specifying sulfurhexafluoride ($SF_6$) as a buffer gas in a membrane enclosure, as this gas has a much lower permeation rate than nitrogen. However, as its solubility in typical transformer oils is very high, a defective membrane would lead to the creation of negative pressures in the cooling phase of the transformer.

SUMMARY OF THE INVENTION

To meet the goal of a sufficient state of gas de-saturation of a medium in which decomposition gases and, in some designs, also extraneous gases may be present, traditional solutions to the complex problem of the coexistence of temperature-driven volume changes on the one hand and the consequences of the generation of decomposition gases on the other hand are replaced by the complementary means of (a) continuous on-line degassing and (b) a liquid expansion facility which is placed in a manner that excludes the possibility of decomposition gas accumulation and is designed to virtually exclude contact with air and air humidity.

Figure 3:
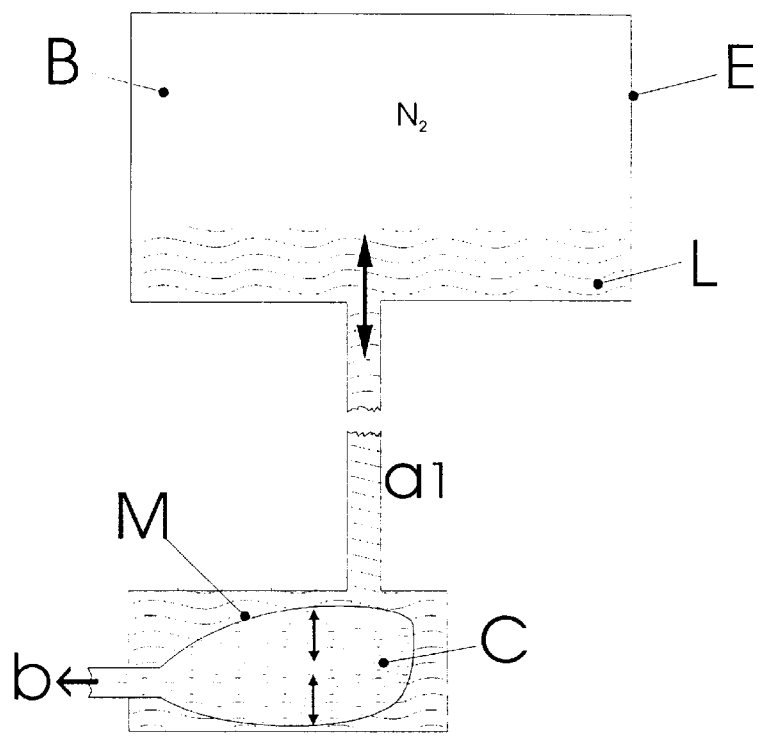
Figure 4:
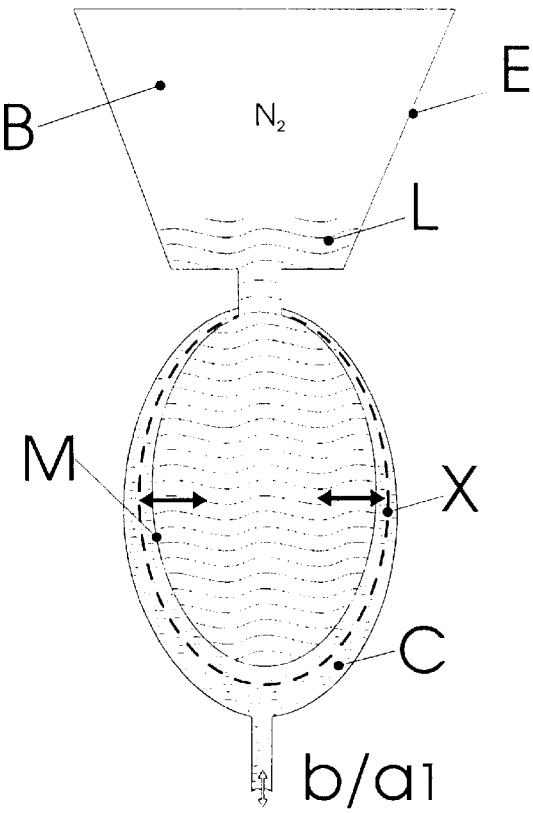

(V) vacuum e.g. of 0.5 bar;

(a) column height 6 m at density 1 kg/dm³ results in a hydrostatic pressure of 0.6 bar, which results in a system pressure in the transformer tank (at the top) of 1.1 bar (absolute);

(e) connection to expansion vessel (FIG. 3 or FIG. 4);

(C) heat transfer and insulating liquid, likewise in FIG. 3 and FIG. 4;

(T) transformer (or "user" part of a high-temperature heat transfer system).

Figure 2:
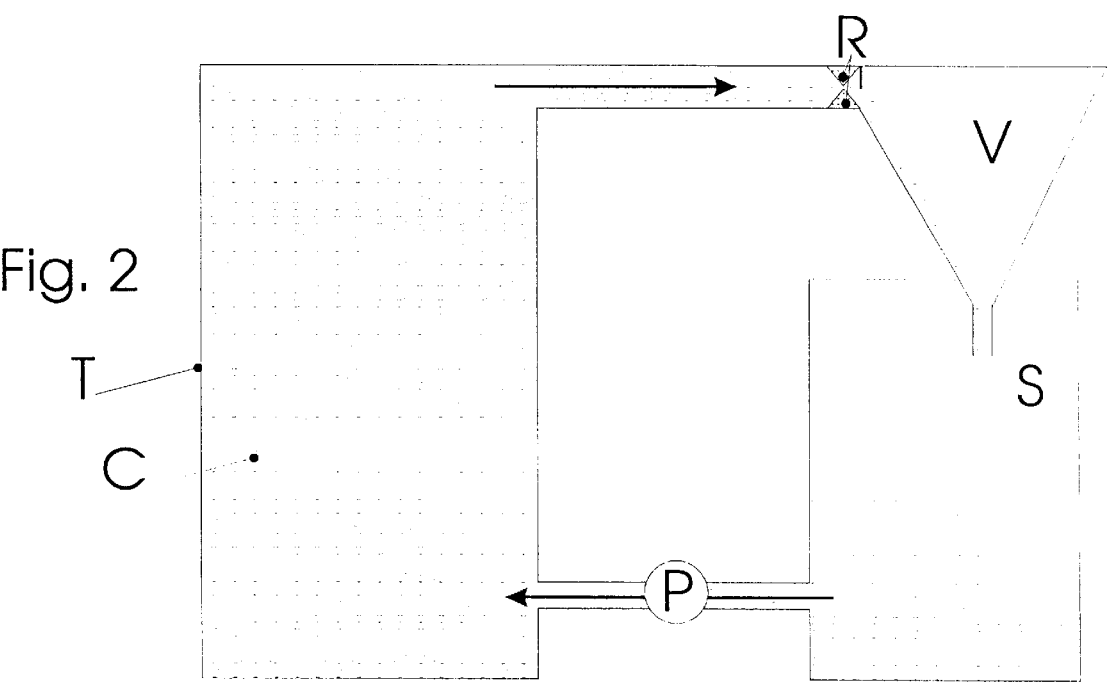

FIG. 2 depicts a system in which (C) is heat transfer and insulating liquid;

(P) is an impeller placed upstream of (T) the transformer (or "user" in a high-temperature heat transfer installation) and in which (R) is a restrictor placed downstream of the transformer (T) to ensure pressurizing of transformer (T) and the liquid (C) which it contains. Downstream of the restrictor (R) is (V) the degassing vessel feeding into (S) the liquid collector.

FIGS. 3 and 4: Keeping out extraneous gases:

(B) is inert buffer gas volume;

(C) is heat transfer and insulating liquid;

(E) is expansion vessel;

(L) is buffer liquid;

(M) is membrane;

(al) is arranged differently in FIG. 3 and FIG. 4, while function remains the hydrostatically effected creation of a compensatory pressure.

Figure 1:
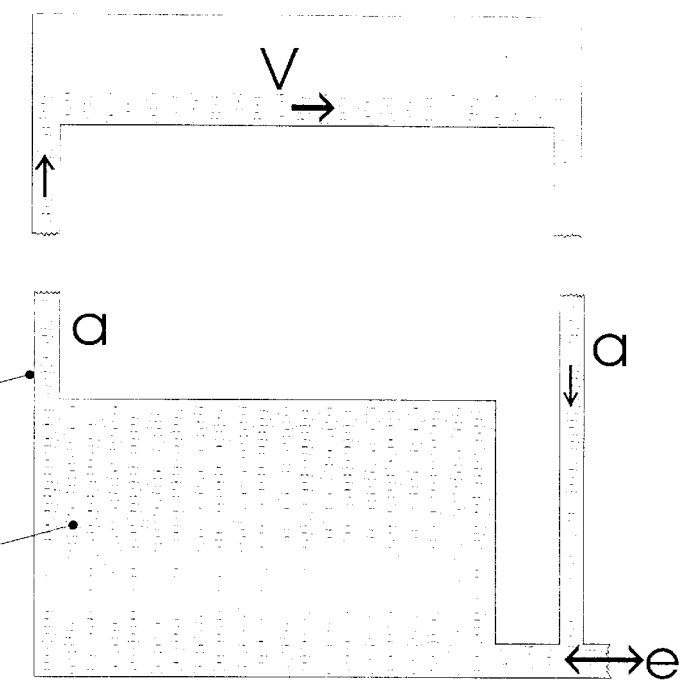
FIG. 1 De-gassing of heat transfer/insulating liquid with simultaneous compensation of the negative pressure by increasing the hydrostatic pressure.

FIG. 3: Expansion vessel with (L) buffer liquid outside membrane enclosure;

(b) is connection to (e) in FIG. 1;

FIG. 4: Expansion vessel with (L) buffer liquid inside membrane enclosure;

(X) is perforated membrane-support and can be used in analogous manner in arrangement shown in FIG. 3;

(b/al) the dual denomination (b/al) denotes the dual function of the connection.

DETAILED DESCRIPTION OF THE INVENTION

As the part of the invention depicted in FIG. 3 and FIG. 4 can be used separately from the part depicted in FIG. 1, albeit only in systems where the generation of decomposition gases can be neglected, e.g. distribution transformers with primary voltages of typically 20 kV, it is described first. It is, with certain modifications, the object of a patent application before the German Patent Office pending (Application Filing No. 196 26 516.9-43)

Use of the design possibilities to attain freedom from extraneous gases (FIG. 3 and FIG. 4)

This is achieved by the use of hitherto neglected physico-chemical factors with the aim of reducing the permeation rate of extraneous gases through a membrane by reducing the number of available gas molecules.

The permeation rate of gases—in this case mainly $N_2$, $O_2$, $H_2O$—through a membrane not only depends on the pressure gradient and the permeability of the membrane for different molecules, but also on the density (the concentration) of these molecules on that side of the membrane which faces the gas.

Gas concentration can be dramatically reduced by allowing the molecules to come into contact with the membrane only via a fluid medium in which the gas molecules are present in much smaller numbers, i.e. the gas is dissolved in the liquid. Any liquid compatible with the insulating or heat transfer liquid can be used for the purpose—even liquids with a relatively high $N_2$, $O_2$, $H_2O$ solubility, as even in such cases the dilution factor will remain very high. The number of molecules available for permeation can be reduced without applying a vacuum to the liquid, although this option is also made available through the present invention (FIG. 3 and FIG. 4 show a schematic representation without detailing the options).

The device, in conjunction with its complement depicted in FIG. 1, brings into play the laws of hydraulics and thus permits the positioning of the expansion facility by the side of or under the transformer. Complementary to this is the possibility of freeing the liquid from decomposition products, as the expansion facility no longer interferes with the degassing facility.

There are further advantages inherent in the present invention:

1) mechanical strain on the membrane is reduced
2) chemical attack on the membrane will be less by comparison to arrangements where the membrane is in contact with oxygen.

An inverse arrangement to that shown in FIG. 3 can be used to serve the same purpose, as shown in FIG. 4. It is also possible to apply the same principle in a simpler arrangement in which the buffer liquid is in contact with the outside air, optionally via a Florentine flask. The simplified version does, however, not offer the same flexibility of design and installation, as the element of pressure variability, i.e. pressurizing or vacuum cushioning by an inert gas cushion B is absent (FIG. 3 or FIG. 4).

Still another variant to that shown in FIG. 3 and FIG. 4 would be one in which the buffer gas containment incorporated an inflatable/deflatable bag placed outside E or within the confinement of E which would be open to the outside air. Minimization of dissolved decomposition gases by putting to use the simultaneous creation of hydrostatic pressure by liquid columns of appropriate height and creation of a compensatory vacuum in a degassing chamber through which the thermosiphoning liquid passes. (FIG. 1).

Alternative system:

Minimization of dissolved decomposition gases by the complementary measures of providing a degassing facility in the low-pressure area of a system characterized by the action of an impeller and a restrictor and achieving further desaturation by the application of pressure on the liquid (FIG. 2).

The invention as shown in FIG. 1 provides a hydrostatic compensating means resulting in a pressure increase in the active part of the transformer, such compensation being needed to counterbalance a pressure decrease created by the application of a vacuum above the liquid flowing through a vessel arranged at the highest point of the system. The combined effect of pressure increase in the transformer and degassing is an absolute decrease in the quantity of dissolved decomposition gases in an insulation or heat transfer medium and a high degree of de-saturation in those parts of the system, where gas saturation is a potential hazard, i.e. the active part of a power transformer or the pumps of a heat transfer plant.

The possibility of liberating decomposition gases dissolved in the insulating liquid by means of applying a vacuum to the traditional expansion vessel has not been realized before, as the cyclic load patterns entail changing liquid volumes in the conservator, which would necessitate the continuous operation of a vacuum pump, and as the safety implications of a high level of decomposition gases are not generally perceived to warrant a departure from traditional transformer design and transformer installation.

Moreover, applying an uncompensated vacuum to a power transformer would be hazardous, as this would liberate gases: low pressure could turn the de-saturated liquid into a supersaturated one.

In the system illustrated in FIG. 1 therefore on-line degassing has to be complemented by means to compensate the vacuum. The goal can be met by bringing into play hydrostatic principles as depicted in FIG. 1. In FIG. 2 the creation of a pressurized and a depressurized area where the transformer (T) or, in analogue manner, the "user" in a heat transfer system, is pressurized, while that part of the system situated between restrictor (R) and pump (P) is subjected to a vacuum created by the same means that create pressurized conditions in that part of the system where a high degree of de-saturation is wanted.

With respect to transformers, in the alternative illustrated in FIG. 2, there is no need to compensate for vacuum-induced pressure reduction by means such as the arrangements illustrated in FIG. 3 and FIG. 4, as the collecting vessel (S in FIG. 2) for the degassed liquid can be dimensioned large enough for temperature-driven liquid volume increase. However, in the event of any failure of the degassing function in the arrangement shown in FIG. 1, or in the event of a fault-induced sudden pressure rise in the transformer tank, the expansion facility illustrated in FIG. 3 and FIG. 4 will always be of great benefit, as it reduces the risk of tank rupture and permits the use of flexible tanks and radiators.

With respect to high-temperature heat-exchange systems, the inclusion of an expansion facility as shown in FIG. 3 and FIG. 4, while not strictly necessary, is highly desirable, as it greatly facilitates the start-up procedure during which the liquid volume increases typically by more than one third.

In traditional high-temperature heat-exchange systems the expanding liquid displaces the inert blanketing gas in the expansion vessel during start-up. "Venting" the expansion vessel to reduce system pressure build-up results in loss of nitrogen but also to emissions of decomposition gases into the atmosphere if no condensation facility is provided for. Although venting entails some degassing, such degassing is quite inadequate.

Typically, decomposition gases are dissolved in the liquid immediately at the time of their formation; they will only change their state when conditions favour such change. Most important among these are a high degree of saturation, turbulence, and protrusions. In transformers, these elements, together with vibrations, play an important rôle in the triggering of the Buchholz relay in the absence of a fault current that could produce decomposition gases in detectable quantities.

As on-line degassing by the application of a vacuum excludes any possibility of the formation of an explosive mixture of gases—oxygen being excluded—the invention obviates the need for nitrogen blanketing.

The principle at work is explained with transformers serving as an example, reference being made to hydrostatic means of compensation for vacuum-induced pressure reduction (FIG. 1). Spontaneous formation of micro-bubbles in the tank can be rendered unlikely by increasing the degree of de-saturation in the tank. This is achieved by a combination of two measures: the liquid is continuously de-gassed; de-saturation is increased by increasing the pressure in the tank well above the pressure in the de-gassing vessel. FIG. 2 depicts an alternative arrangement to that shown in FIG. 1, hydrostatic pressure being replaced by the pressurizing action of an impeller in conjunction with a restrictor.

The place hitherto occupied by a conservator is now given to a degassing vessel to which a vacuum is applied in order to extract part of the gases dissolved in the liquid. To ensure a high degree of de-saturation in the transformer tank, an appropriate hydrostatic pressure has to be created which slightly over-compensates the vacuum in the degassing vessel. FIG. 4 shows an alternative means of pressurization of part of the system, hydrostatic pressure being replaced by the analogous pressurizing action of an impeller. Increasing the pressure on a liquid always increases its degree of de-saturation.

With reference to FIG. 1 which depicts vacuum compensation by hydrostatic means, the quantity of thermosiphoning liquid passing through the degassing vessel is determined by the difference in density of the liquid in the ascending and descending column and by the pipe diameter. The ascending pipe shall be thermally insulated, the descending pipe can be furnished with fins or means to the same end. Degassing efficiency is influenced by the liquid surface area. Degassing influences the absolute solubility, not the ratio, of the different decomposition gases. As it is the latter that is relevant for DGA diagnostics, degassing has no negative influence on dissolved gas analysis and the interpretation of DGA results by means of so-called criteria quotients.

FIG. 2 depicts the same systemic arrangement as FIG. 1, the difference being the means with which the effect of the vacuum on pressure in the transformer is compensated for and with which the de-gassed liquid is de-saturated further. Here, pressurization of the active part of the transformer (or the "user" part of a heat transfer system) is effected not by hydrostatic means but by the simple means of an impeller at one end and a restrictor at the other.

In order to avoid large fluctuations of the liquid level in the degassing vessel in FIG. 1 and thus fluctuations of the vacuum, as would be expected with transformers having extreme load cycles, a new concept of expansion vessel (FIG. 3 or FIG. 4) is introduced which is designed to ensure the functioning of the degassing unit without overdimensioning the degassing chamber. Its functioning under cyclic load patterns of a transformer connected to an on-line de-gassing unit is described below:

The transformer liquid communicates with a compressible balloon-type expansion device (FIG. 3) which can be positioned above, below or at the side of the transformer. The expansion device uses a membrane which is immersed in a buffer liquid.

When the transformer load increases, the dielectric liquid, generally referred to as "oil", increases in volume as it is being heated, while its mass remains the same.

As the liquid volume increase will not lead to a proportionate or significant increase in the column height and as the liquid in the ascending pipe will be of lower mass, a small decrease of the vacuum may be considered welcome. In this context it has to be remembered that any increase in the liquid temperature translates into a higher degree of de-saturation for a number of gases, especially water that will exist only in the form of "vapour" associated to the liquid molecules via hydrogen bridges.

Depending on which de-gassing regime is followed, but also depending on the dimensioning of the de-gassing vessel, the compensatory expansion vessel shown in FIG. 3 and FIG. 4 will compensate for volume or pressure changes.

Assuming that the liquid volume increase at maximum oil temperature were to result in a vacuum of 0.9 bar instead of 0.5 bar in the degassing vessel, the pressure in the transformer would increase by as much (0.4 bar), which would translate into a pressure increase, and consequently, a volume increase of the liquid in the compensation vessel (FIG. 3 or FIG. 4). As the compensation vessel will take up most of the temperature-induced liquid volume increase, the vacuum in the degassing vessel will change only slightly.

Thus the complementary nature of the arrangement shown in FIG. 3 and FIG. 4 is twofold: Not only can the liquid volume changes be accommodated but the vacuum can be maintained and pressure variations kept to a minimum.

In the case of the variant in which a vacuum is provided as a gas cushion above the buffer liquid, analogue observations apply. In the arrangement where the gas cushion communicates with the atmosphere, a proportionately larger amount of the dielectric liquid will enter the compensation vessel (not shown but similar to the arrangement in FIG. 3 and FIG. 4 with the exception that E is not closed to the atmosphere) compared to the arrangement shown in FIG. 3 and FIG. 4.

If we assume invariable temperatures in the systems envisaged, there will be no need for means to accommodate liquid expansion and contraction. While such systems will be very rare, they are theoretically possible. If we assume that means to extract decomposition gases are not required, as the liquids will not be subjected to either thermal or other decomposition, means for gas evacuation are clearly unnecessary. Such systems are less rare (distribution transformers) but are not likely to warrant the level of engineering sophistication which my invention calls upon.

What I claim as my invention:

1. A system of two complementary devices, the first of which ensuring a minimization or elimination of unwanted gas liberation in a dielectric or heat transfer liquid, the second ensuring ease of accommodation of temperature-driven volume changes of the liquid without the need for contact with an extraneous gas by the second device, the first component or device being characterized by a degassing element being compensated by hydrostatic means or the combination of impeller and restrictor, either means ensuring a further decrease of the saturation level of a continuously de-gassed and de-saturated liquid, the second component of the complementary system being an expansion unit characterized by an arrangement in which the dielectric or heat transfer medium is accepted by a volume-variable space which is separated by an impermeable membrane from a buffer liquid which can be displaced into a space filled either with air communicating with the atmosphere, or with an inert dry gas whose volume will be variable and whose pressure can be chosen to suit the circumstances of any particular installation, with any one of the options chosen to suit installation requirements.

* * * * *